(12) United States Patent
Filippov et al.

(10) Patent No.: US 12,580,648 B2
(45) Date of Patent: Mar. 17, 2026

(54) REVERSED FIBER DETECTION AND CORRECTION IN OPTICAL TRANSCEIVERS

(71) Applicant: Cisco Technology, Inc., San Jose, CA (US)

(72) Inventors: Valentin Filippov, Maple (CA); Elena Gribanova, Dublin, CA (US); Pedro Jesus Garcia Chavez, CDMX (MX); Wei Yan, Oakland, CA (US); David C. White, Jr., St. Petersburg, FL (US)

(73) Assignee: Cisco Technology, Inc., San Jose, CA (US)

( * ) Notice: Subject to any disclaimer, the term of this patent is extended or adjusted under 35 U.S.C. 154(b) by 281 days.

(21) Appl. No.: 18/330,123

(22) Filed: Jun. 6, 2023

(65) Prior Publication Data
US 2024/0413901 A1 Dec. 12, 2024

(51) Int. Cl.
| | |
|---|---|
| *H04B 10/079* | (2013.01) |
| *H04B 10/038* | (2013.01) |
| *H04B 10/40* | (2013.01) |
| *H04B 10/50* | (2013.01) |

(52) U.S. Cl.
CPC ....... *H04B 10/0791* (2013.01); *H04B 10/038* (2013.01); *H04B 10/0795* (2013.01); *H04B 10/40* (2013.01); *H04B 10/50* (2013.01)

(58) Field of Classification Search
None
See application file for complete search history.

(56) References Cited

U.S. PATENT DOCUMENTS

| | | | | |
|---|---|---|---|---|
| 6,684,347 B1 | 1/2004 | Coffey | | |
| 7,613,391 B2 * | 11/2009 | Tajima | ................ | H04J 14/0289 |
| | | | | 398/5 |
| 9,037,755 B2 * | 5/2015 | Tang | .................... | G02B 6/4246 |
| | | | | 710/10 |
| 2009/0290517 A1 * | 11/2009 | Rao | ......................... | H01Q 3/267 |
| | | | | 370/280 |
| 2010/0239266 A1 * | 9/2010 | Kash | .................. | H04Q 11/0005 |
| | | | | 398/140 |
| 2012/0251108 A1 * | 10/2012 | Chen | .................... | H04J 14/0246 |
| | | | | 398/72 |
| 2012/0321309 A1 * | 12/2012 | Barry | .................. | H04J 14/0217 |
| | | | | 398/51 |
| 2014/0241718 A1 * | 8/2014 | Jiang | ...................... | H04B 10/40 |
| | | | | 398/48 |

(Continued)

OTHER PUBLICATIONS

Fiberplex: "FOM-8020 and FOM-8220", Fiber Optic Module, pp. 1-4.

(Continued)

*Primary Examiner* — Darren E Wolf
(74) *Attorney, Agent, or Firm* — Patterson + Sheridan, LLP

(57) ABSTRACT

Embodiments described herein provide for improved detection and correction of a polarity mismatch/swapped fiber without requiring manual intervention. The optical transceivers and methods provide improved detection and correction by determining receive (Rx) optical signals for an optical connection are not detected in a Rx path in an optical transceiver and, upon detecting the crossover Rx optical signals in the Tx path, implementing a crossover correction scheme in the optical transceiver to enable optical connections.

20 Claims, 7 Drawing Sheets

(56) References Cited

U.S. PATENT DOCUMENTS

| | | | |
|---|---|---|---|
| 2015/0043904 A1* | 2/2015 | Boduch | H04B 10/038 |
| | | | 398/2 |
| 2019/0196113 A1 | 6/2019 | Cummings et al. | |
| 2019/0312638 A1 | 10/2019 | Schell et al. | |
| 2021/0239568 A1 | 8/2021 | Lonne | |
| 2023/0254043 A1* | 8/2023 | Bernier | H04B 10/5057 |
| | | | 398/22 |

OTHER PUBLICATIONS

Versitron: "Auto MDI MDIX—Detailed Overview", Aug. 29, 2023, retrieved from https://www.versitron.com/blog/all-you-need-to-know-about-the-auto-mdi-mdix-feature on Apr. 5, 2023, pp. 1-2.

* cited by examiner

REVERSED FIBER DETECTION AND CORRECTION IN OPTICAL TRANSCEIVERS

TECHNICAL FIELD

Embodiments presented in this disclosure generally relate to optical fiber communication networks. More specifically, embodiments disclosed herein provide for detection of reversed fibers at an optical transceiver and implementing a crossover correction scheme to enable an optical connection at the optical transceiver.

BACKGROUND

Optical fiber networks provide increased communication speeds and throughput and are increasing used in a variety of applications. For example, optical fiber networks are used to provide both local network connections (e.g., small scale networks, onsite connections at data centers, etc.) and larger scale networks (e.g., enterprise networks, Internet service provider (ISP) networks, etc.). In each of these examples, communication is enabled over optical fibers which are connected between network devices. These network devices include optical transceivers which transmit and receive optical signals (i.e. light) over the optical fibers and transform the optical signals in order to be handled by the connected network device.

In many cases, these optical fiber networks are manually built and connected. For example, a person manually connects fibers between the network devices. Due to the scale of both the size of optical fiber networks and the potential distance between connected devices, various errors can occur during the manual phase of constructing and connecting the optical fiber networks. For example, swapped fibers which cause mismatches of polarity between receive (Rx) and transmit (Tx) fibers connected to optical transceivers is quite common. These mismatches are typically corrected via manual intervention from network technicians, such as swapping the Rx and Tx fibers to the correct polarity to establish network connectivity. While these manual interventions are seemingly small, these mismatches can cause significant overhead cost in establishing optical fiber networks.

For example, several steps may be involved including troubleshooting why the link is down, where the swapped fibers are one of many potential errors causing the lack of network connection. Additionally, since manual intervention is currently the only solution to a polarity mismatch, a technician may need to travel to the physical location of the swapped fibers to correct the error (increasing time and overhead costs to the network). Improved solutions for detecting and correcting a polarity mismatch remain a challenge.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate typical embodiments and are therefore not to be considered limiting; other equally effective embodiments are contemplated.

To facilitate understanding, identical reference numerals have been used, where possible, to designate identical elements that are common to the figures. It is contemplated that elements disclosed in one embodiment may be beneficially used in other embodiments without specific recitation.

DESCRIPTION OF EXAMPLE EMBODIMENTS

Overview

Figure 1:
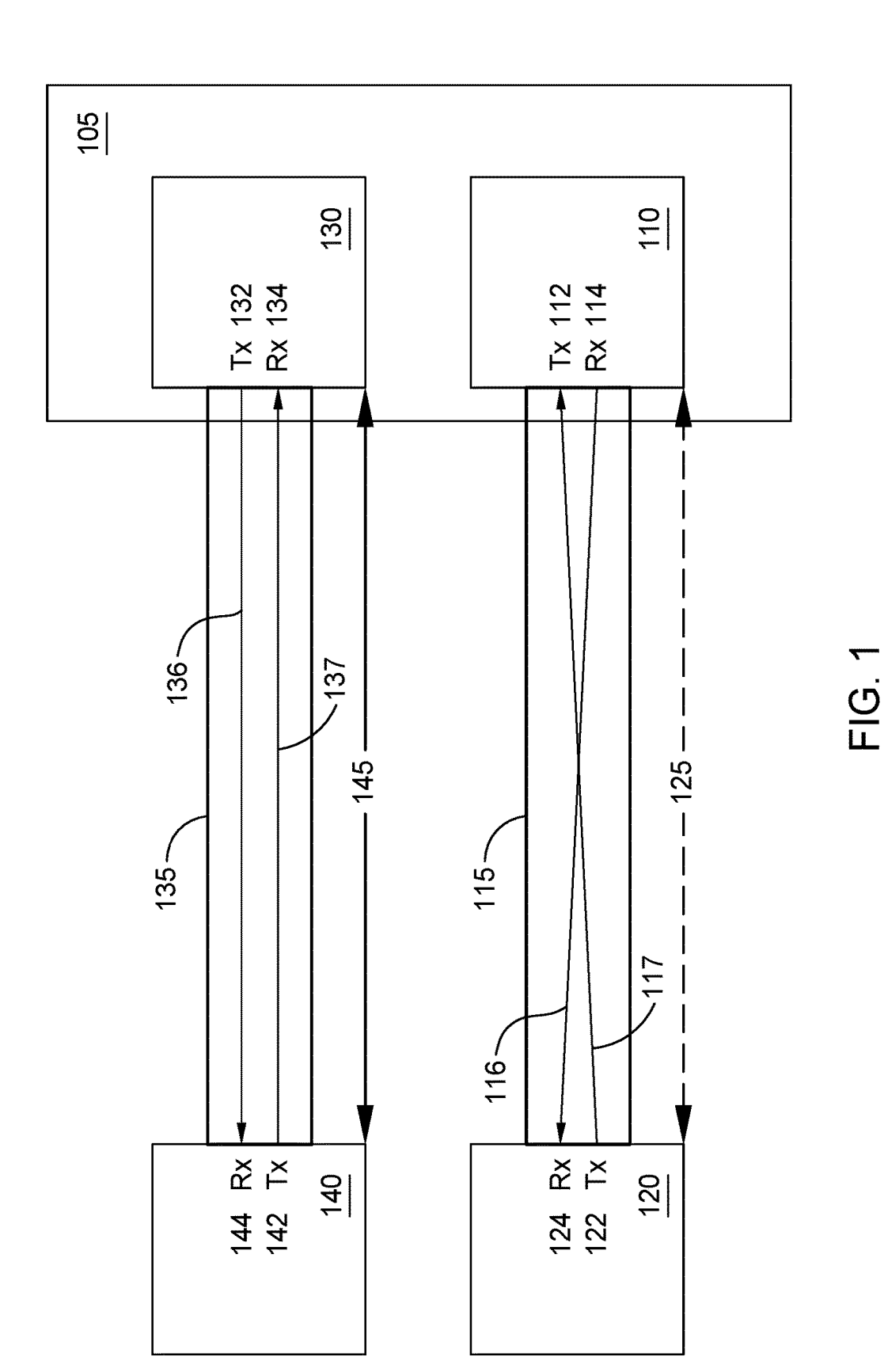
FIG. 1 illustrates an optical fiber network, according to one embodiment described herein.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a method. The method includes determining receive (Rx) optical signals for an optical connection are not detected in a Rx path in an optical transceiver, determining whether crossover Rx optical signals are detected at a light sensor in a transmit (Tx) path in the optical transceiver, and upon detecting the crossover Rx optical signals in the Tx path: implementing a crossover correction scheme in the optical transceiver to enable the optical connection. Other embodiments of this aspect include corresponding computer systems, apparatus, and computer programs recorded on one or more computer storage devices, each configured to perform the actions of the methods.

One general aspect includes an optical transceiver. The optical transceiver includes a processor, and a memory may include instructions which, when executed on the processor, performs an operation. The operation may include: determining receive (Rx) optical signals for an optical connection are not detected in a Rx path in the optical transceiver, determining whether crossover Rx optical signals are detected at a light sensor in a transmit (Tx) path in the optical transceiver, and upon detecting the crossover Rx optical signals in the Tx path: implementing a crossover correction scheme in the optical transceiver to enable the optical connection. Other embodiments of this aspect include corresponding computer systems, apparatus, and computer programs recorded on one or more computer storage devices, each configured to perform the actions of the methods.

One general aspect includes an optical transceiver. The optical transceiver also includes a receive (Rx) path; a transmit (Tx) path; a light sensor in the Tx path; and control logic configured to perform an operation. The operation may include: determining Rx optical signals for an optical connection are not detected in the Rx path; determining whether crossover Rx optical signals are detected at the light sensor in the tx path, and upon detecting the crossover Rx optical signals in the Rx path: implementing a crossover correction scheme in the optical transceiver to enable the optical connection. Other embodiments of this aspect include corresponding computer systems, apparatus, and computer programs recorded on one or more computer storage devices, each configured to perform the actions of the methods.

Example Embodiments

As described above, optical fiber networks are utilized in many different types of communication networks including small and large scale implementations. A common error that these optical fiber networks experience is a polarity mismatch at optical transceivers in network devices. This type of error commonly occurs in several different type of network situations. For example, in new optical network installations, technicians may pull fiber optic cables and plug the pulled fiber optic cables into a port (e.g., an optical transceiver) without fully testing the pulled cable and port. For example, a port may be pre-wired and not immediately needed for network communications as the physical fiber network is built out or is not yet needed due to networking capacity being sufficient at the time of installation. Additionally, fiber infrastructure in older facilities may include a difference in wiring codes/standards among various optical connections, which may lead to a reversal of Tx and Rx fibers. In another example, lab or testing environments may use unpaired or single fibers to connect components together, which leads to frequent erroneous connections.

The optical transceivers and methods described herein provide for improved detection and correction of a polarity mismatch/swapped fiber without requiring manual intervention. This improved detection and correction includes determining receive (Rx) optical signals for an optical connection are not detected in a Rx path in an optical transceiver and, upon detecting the crossover Rx optical signals in the Tx path, implementing a crossover correction scheme in the optical transceiver to enable the optical connection, such as the optical connections shown in more detail in relation to FIG. 1

FIG. 1 illustrates an optical fiber network 100, according to one embodiment. The optical fiber network 100 includes a network device 105. In some examples, the network device 105 may be embodied as one of or combination of a network switch, network storage device (server), or other type of electronic device utilizing optical network communications. In order to communicate over optical connections in the optical fiber network 100, the network device 105 includes optical transceiver (TRX) devices, including TRX 110 and TRX 130. The TRXs 110 and 130 are connected to peer transceivers, including TRX 120 and TRX 140 to create optical connections 125 and 145. In some examples, the TRX 120 and TRX 140 may be collocated on a same network device similar to the network device 105. In another example, the TRX 120 and TRX 140 may be located on different network devices, including network devices at different geographic locations.

In some examples, as the optical fiber network 100 is constructed/installed, a technician connects the TRXs together by providing or pulling optical fibers between the TRXs. For example, a fiber optic cable 135, including fibers 136 and 137, is connected between the TRX 130 and TRX 140. A fiber optic cable 115, including fibers 116 and 117, is connected between the TRX 110 and TRX 120. While shown as paired cables, the fibers may be individual fibers or other combination fibers in a multi-fiber cable. In these case of a non-reversed installation, the optical transceivers transmit optical signals over the fibers to the respective peer transceivers via transmit Tx paths 112, 122, 132, and 142. The optical transceivers also receive optical signals via Rx paths 114, 124, 134, and 144.

For example, in the optical connection 145 between TRX 130 and TRX 140, the Tx path 132 is connected to the Rx path 144 via the fiber 136. The Tx path 142 is connected to the Rx path 134 via the fiber 137. In this example, the fibers 136 and 137 are not crossed/swapped and provide correct signal polarity between the TRX 130 and the TRX 140 such that the optical connection 145 is enabled as shown in FIG. 1.

As described above, in some cases, the fibers between various transceivers may be erroneously reversed, switched, crossed, etc. during installation/connection. For example, an installer may reverse the fiber optic cable 115 such that the fibers 116 and 117 are connected to wrong signal channels or paths in the optical transceivers. For example, the fiber 117 is connected between the Tx path 112 and Tx path 122. The fiber 116 is connected between the Rx path 124 and the Rx path 114. In this example, optical connection 125 is not enabled since the TRX 110 and TRX 120 cannot communicate via normally transmitted optical signals. For example, neither transceiver receives signals via respective Rx paths 114 and 124. In some examples, the TRX 110 provides reversed fiber detection and correction as described in more detail in relation to FIGS. 2-5 herein.

Figure 2:
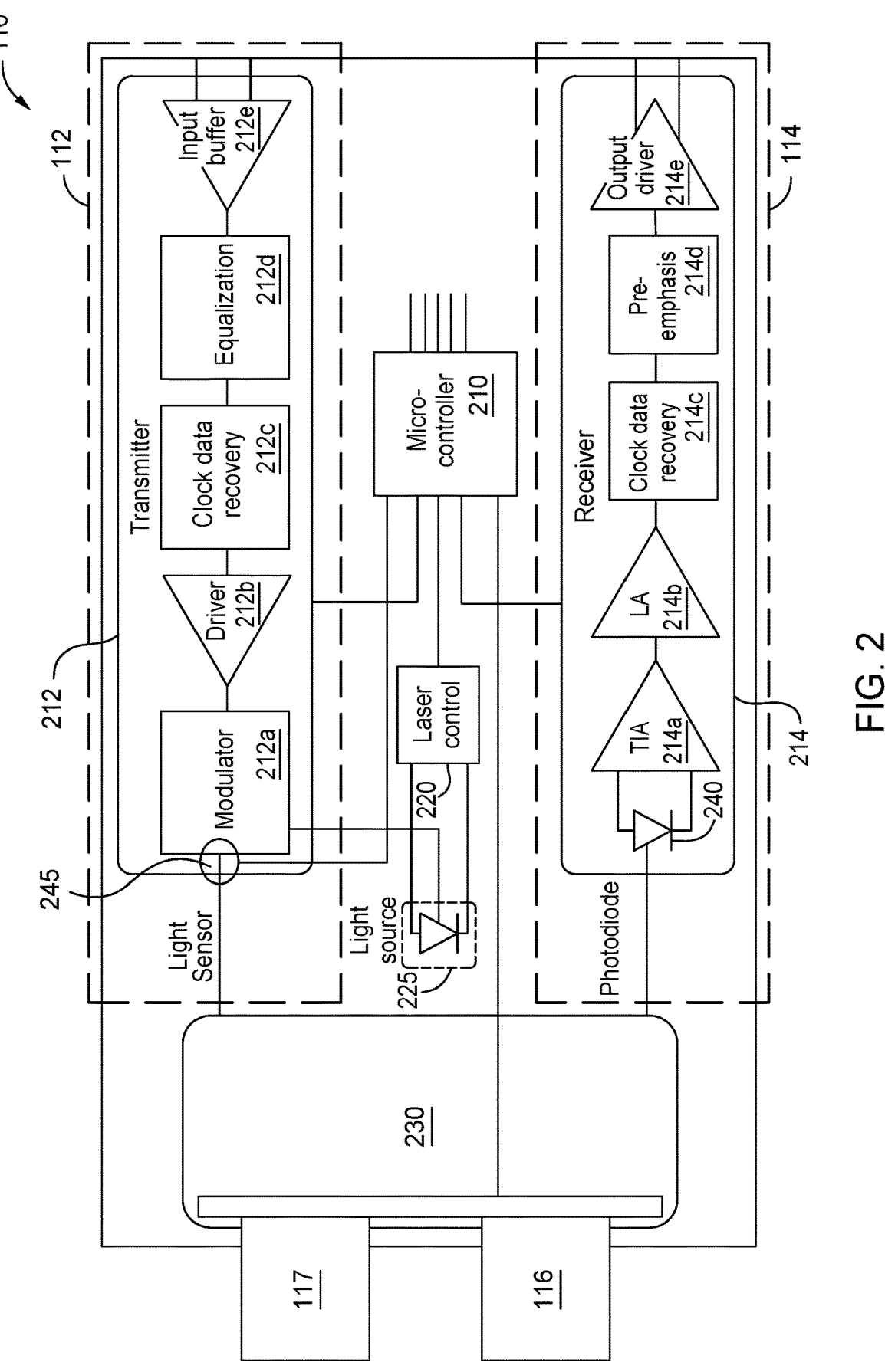
FIG. 2 illustrates an optical transceiver with reversed fiber detection and correction, according to one embodiment described herein.

FIG. 2 illustrates an optical transceiver with reversed fiber detection and correction, according to one embodiment described herein. The TRX 110 includes a transmitter 212 including transmitter components 212a-212e which transform signals received from the network device 105 into Tx optical signals for the optical connection 125. The transmitter 212 and a light sensor 245 form the Tx path 112. The TRX 110 also includes a receiver 214 including receiver components 214a-214e which receives Rx optical signals from the optical connection 125 and transform the Rx optical signals received from the network device 105 into Tx signals for the optical connection 125. The receiver 214 and photodiode 240 form the Rx path 114.

The TRX 110 also includes a coupling interface 230. In some examples, the coupling interface 230 is a general coupling interface between a fiber connection and internal components of the TRX 110. The coupling interface 230 may also include a 2×2 optical switch (or other type of optical switch) which performs the various crossover and other functions described herein. The TRX 110 also includes laser control module 220 and a light source 225 (e.g., a laser diode). In some examples, the functions of the TRX 110, including the operations of the transmitter 212, receiver 214, coupling interface 230, laser control module 220, light sensor, and photodiode 240, are controlled by a micro-controller 210. The reversed fiber detection and correction operations of the micro-controller 210 are described in more detail in relation to the methods of FIGS. 4 and 5 and a block diagram of the micro-controller 210 is shown in more detail in relation to FIG. 7 herein.

Figure 3A:
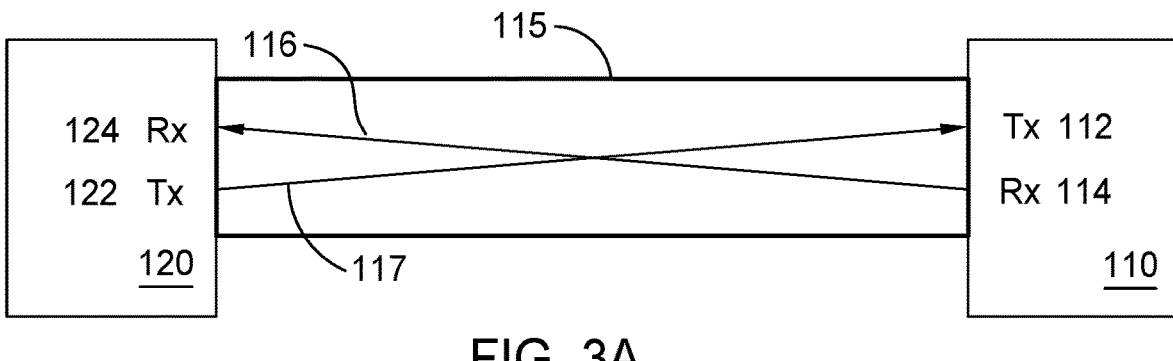
FIG. 3A-C illustrate reversed fibers in an optical connection, according to embodiments described herein.
Figure 3B:
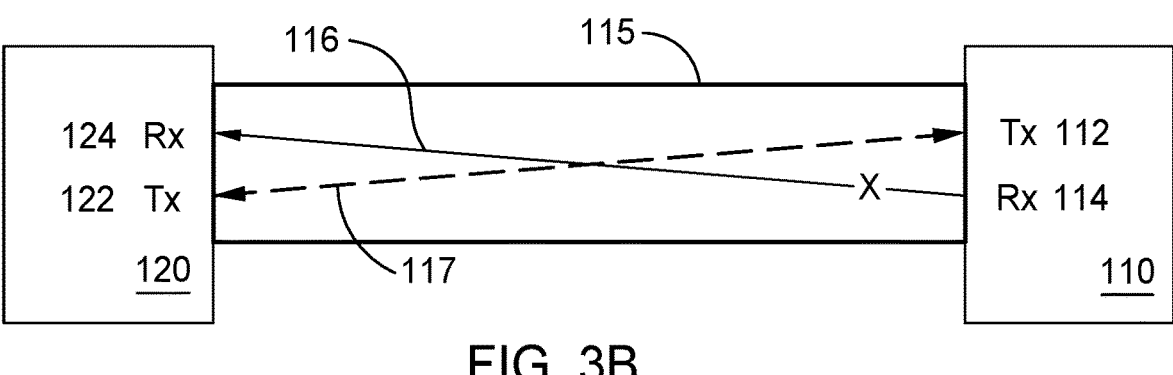
Figure 3C:
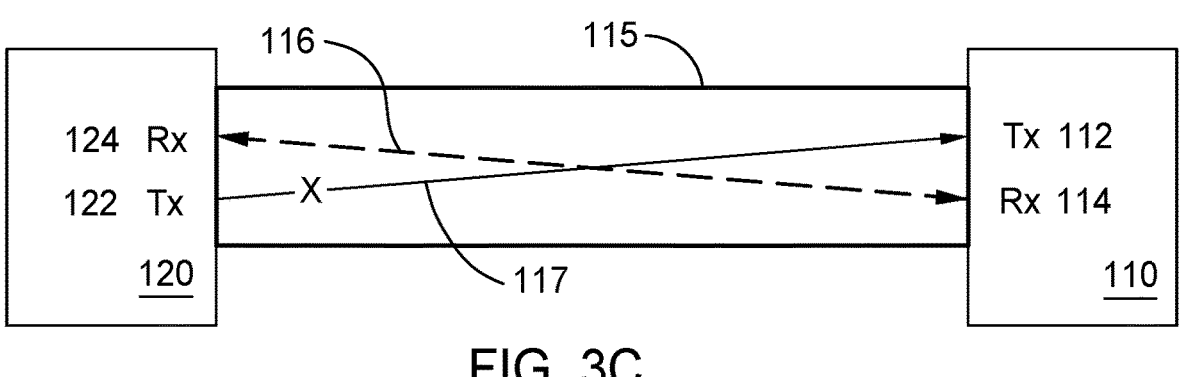
Figure 4:
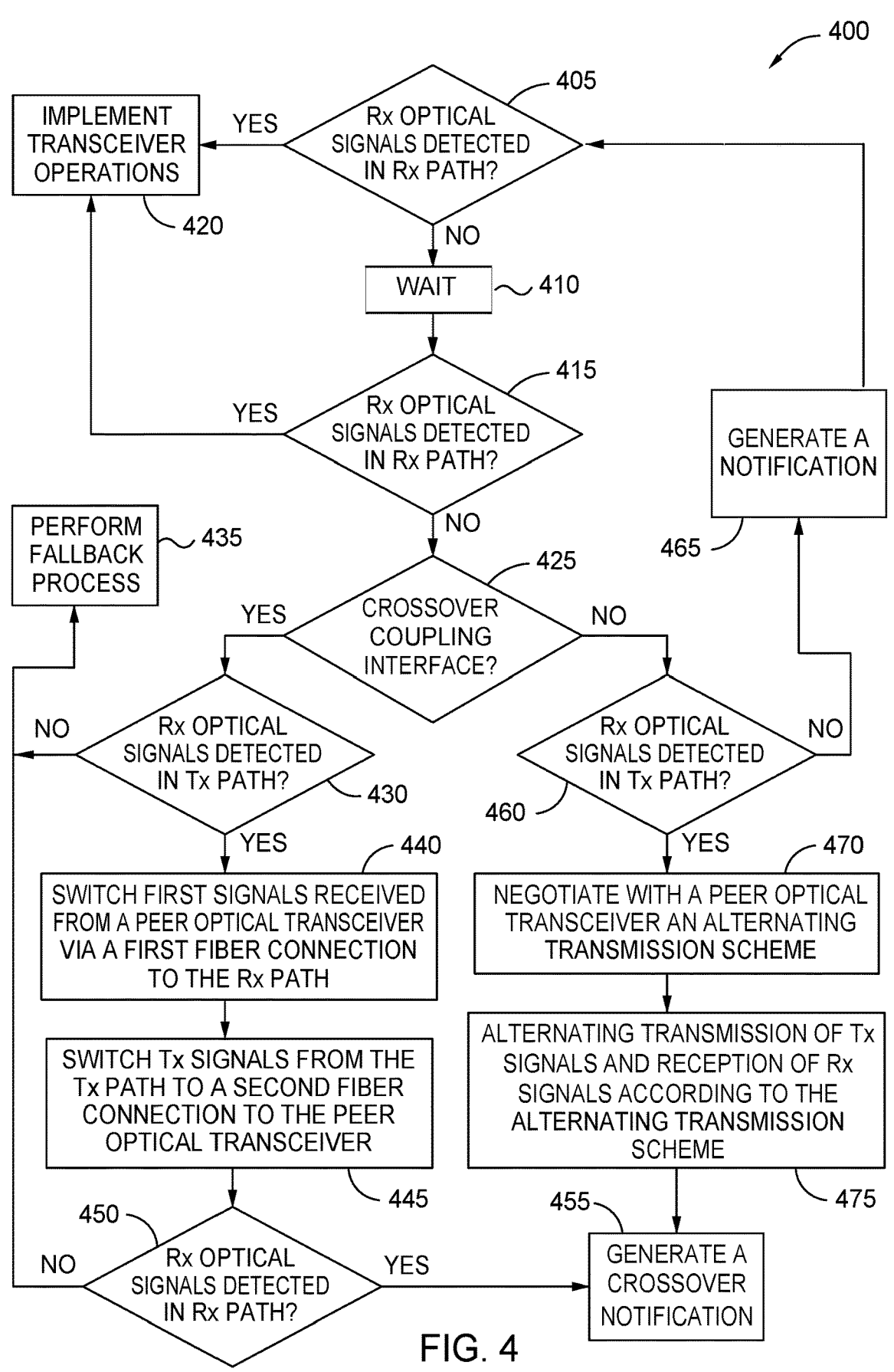
FIG. 4 is a method for reversed fiber detection and correction, according to one embodiment described herein.
Figure 5:
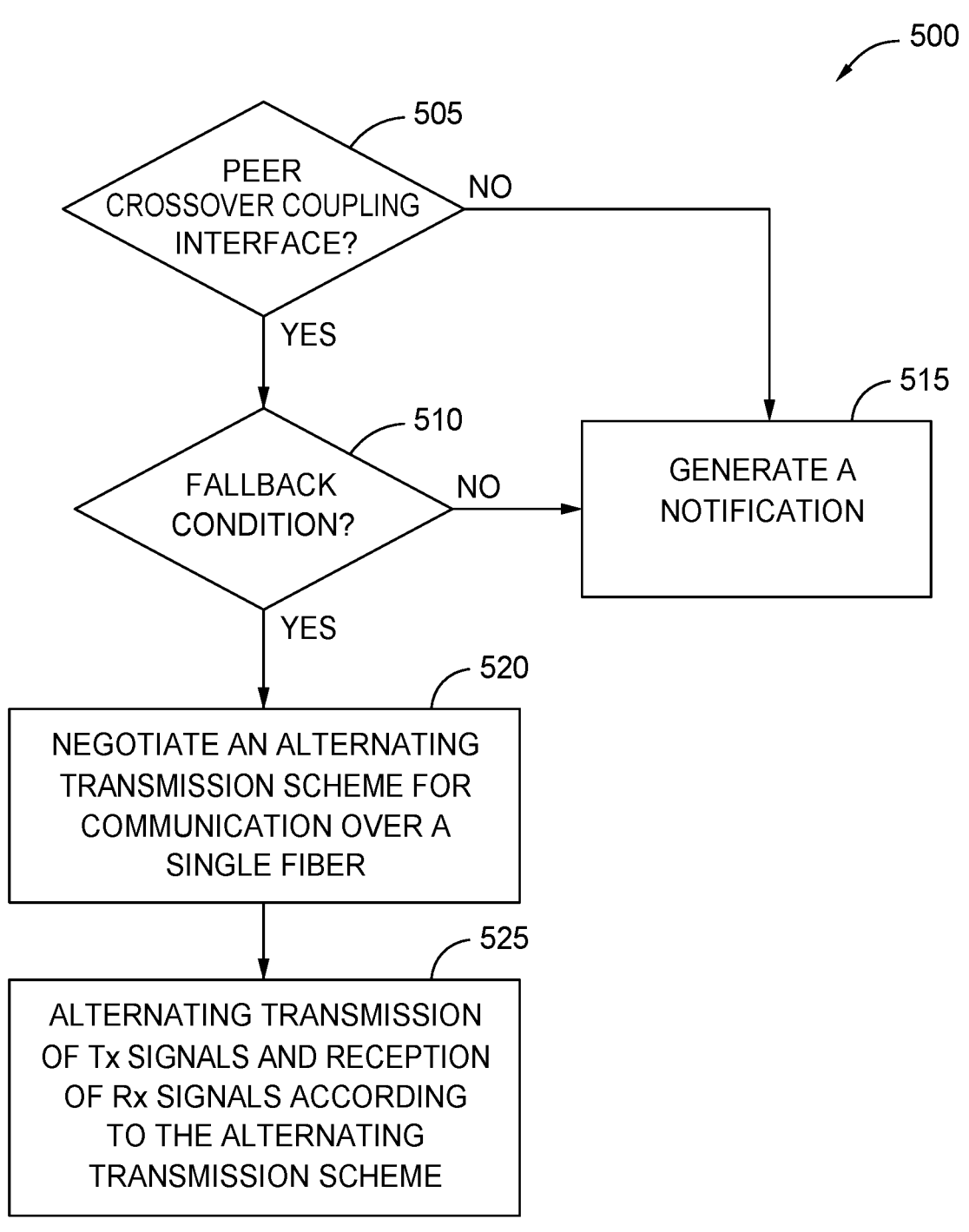
FIG. 5 is a method for a fallback process for a detected reversed fiber detection, according to one embodiment described herein.
Figures 6A, 6B, 6C, 6D:
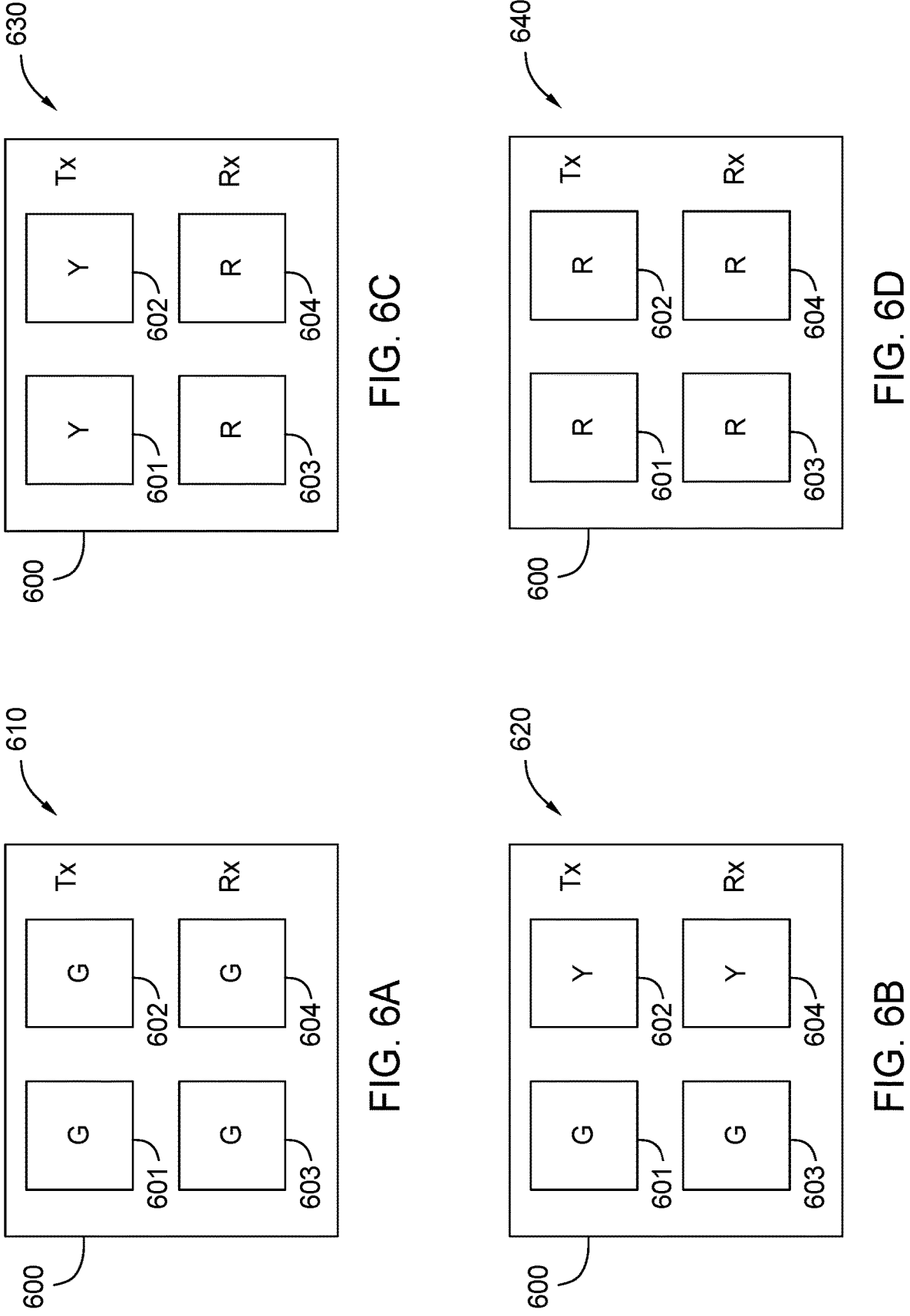
FIGS. 6A-6D illustrate lighting patterns on a user interface associated with an optical transceiver, according to embodiments described herein.

FIG. 3A-C illustrate reversed fibers in an optical connection, according to embodiments described herein. FIG. 4 is a method 400 for reversed fiber detection and correction and FIG. 5 is a method 500 for a fallback process for a detected reversed fiber detection, according to embodiments described herein. For ease of discussion, methods 400 and 500 will be discussed in conjunction with the reversed fibers arrangements shown FIGS. 3A-3C and the examples shown in FIGS. 1-2. Additionally, for ease of clarity the operations of methods 400 and 500 will be discussed as being performed by the TRX 110 (using the micro-controller 210); however it is understood that the methods and operations may be performed by any optical transceiver capable of performing reversed fiber detection and correction.

Method 400 of FIG. 4 begins at block 405 where the TRX 110 determines whether receive (Rx) optical signals for an optical connection are detected in an Rx path in an optical transceiver. In some examples, the TRX 110 initiates the method 400 upon installation of the optical network and/or installation of the optical connection 125. The TRX 110 uses the photodiode 240 to detect any optical signals in the Rx path 114. In an example where the photodiode 240 detects optical signals, the TRX 110 determines the polarity of the Rx optical signals is correct at block 405 and method 400 proceeds to block 420 where the TRX 110 proceeds with transceiver operations for the optical connection (i.e., functions normally). For example, the TRX 130 upon installation of the optical connection 145 detects Rx optical signals in the Rx path 134, indicating a correct polarity of the fibers 136 and 137, and proceeds with normal network/optical communications over the optical connection 145.

In another example, the photodiode 240 does not detect any optical signals in the Rx path 114. In this example, method 400 proceeds to block 410 where the TRX 110 waits for a given time to allow for boot up or other connection processes to be performed in the connection. For example, the wait at the block 410 allows for a peer device such as the TRX 120 to boot up and attempt to transmit Tx optical signals to the TRX 110 or implement a crossover correction if one is present in the network connection. The duration of the pause may be governed by various parameters on the TRX 110 to prevent a potential race condition or correction loop between the TRX 110 and the TRX 120.

At block 415, at a recheck time, the TRX 110 rechecks the Rx path for the Rx optical signals. For example, when the photodiode 240 detects RX optical signals at the recheck time, method 400 proceeds to block 420 and the TRX 110 proceeds with transceiver operations for the optical connection. This may indicate that the connection is normal and/or may indicate that the peer transceiver has provided crossover correction. In another example, where Rx signals are not detected at the recheck time, method 400 proceeds to block 425.

At block 425, the TRX 110 determines crossover capabilities of a coupling interface of the optical transceiver. For example, the TRX 110 determines whether the coupling interface 230 is capable of switching signals between the fibers 117 and 116 and the Tx path 112 and Rx path 114. For example, the coupling interface 230 may include a 2×2 optical switch, which enables the crossover switching. In an example where the interface 230 is crossover enabled, the method 400 proceeds to block 430. At block 430, the TRX 110 determines whether crossover Rx optical signals are detected at a light sensor in a Tx path in the optical transceiver. For example, the TRX 110 determines whether the light sensor 245 detects signals received from the interface 230. In some examples, the TRX 110 may stop transmission of Tx optical signals in the Tx path (e.g., block light from the light source 225) and check the light sensor for the crossover Rx optical signals once the light source 225 is blocked. In another example, the light source is not blocked and the light sensor 245 detects Rx signals while the transmitter 212 operates and emits Tx signals.

In one example, the TRX 110 may not detect any Rx signals in the Tx path. In some examples, the lack of Rx signals in the signal path may indicate both reversed/swapped fibers and a fiber connection issue as shown in FIG. 3C. In this example, the fiber 116 is reversed and connected. The fiber 117 is reversed, but is experiencing a connection issue. In some examples, the TRX 110 may be able to enable the optical connection 125 for the arrangement shown in FIG. 3C, without manual intervention using a fallback process. In this example, method 400 proceeds to the fallback process at block 435 for further processing. The fallback process is described in more detail in relation to method 500 in FIG. 5.

With reference to FIG. 5, method 500 being sat block 505, where the TRX 110 determines whether a peer optical transceiver on the optical connection is crossover enabled. For example, the TRX 110 determines via communications with the TRX 120, whether the TRX 120 includes a crossover enabled coupling interface (similar to the coupling interface 230 with crossover enabled or any other type of optical interface which may enable crossover switching process described herein). In an example, where the TRX 120 is not crossover enabled, method 500 to block 515 where the TRX 110 generates a connection error notification indicating the TRX 110 is unable to enable the optical connection 125.

In an example where the TRX 120 is crossover enabled, method 500 proceeds to block 510 where the TRX 110 determines whether a fallback condition is present in the optical connection. For example, if the fibers 116 and 117 are swapped and one of the fibers is not fully connected as shown in FIGS. 3B and 3C, a fallback condition is present and method 500 proceeds to block 520 to implement a crossover correction scheme. In another example, the TRX 110 may determine that neither fiber is fully connected or has another type of connection problem between the modules. In this example, method 500 proceeds to block 515.

Returning back to block 520, the TRX 110 implements the crossover correction scheme by negotiating an alternating transmission scheme for communication over a single fiber between the peer optical transceiver and the optical transceiver with the peer optical transceiver. At block 525, the TRX 110 alternates transmission of Tx optical signals and reception of Rx optical signals over the single fiber, according to the alternating transmission scheme at block 525. In this example, the coupling interface 230 switches (as needed) the Tx signals and Rx signals to transmit over the single fiber according to the alternating transmission scheme. In some examples, upon enabling the fallback crossover scheme according to method 500 the TRX 110 proceeds to block 455 of method 400.

Returning back to block 430 of FIG. 4, in another example, the TRX 110 does detect Rx signals in the Tx path via the light sensor 245. In this example, the detection of the Rx signals in the Tx path indicates that the fibers are reversed and may include the arrangements of fibers shown in FIGS. 3A and 3B. In this example, method 400 proceeds to block 440 to implement a crossover connection scheme. In some examples, prior to performing the blocks 440 and 445, the TRX 110 implements a backoff time to determine whether the peer optical transceiver (i.e. TRX 120 has implemented a peer crossover correction scheme). In this example, the TRX 110 rechecks the Rx path 114 for the Rx optical signals before proceeding to blocks 440 and 445.

At block 440, the TRX 110 switches, at the coupling interface, first signals received from a peer optical transceiver via a first fiber connection to the Rx path in the optical transceiver. For example, the TRX 110 switches Rx signals received via the fiber 117 to the Rx path 114 at the coupling interface 230.

At block 445, the TRX 110 switches, at the coupling interface, Tx optical signals transmitted from the optical transceiver to the peer optical transceiver from the Tx path in the optical transceiver to a second fiber connection to the peer optical transceiver. For example, the TRX 110 switches Tx signals from the Tx path 112 to the fiber 116 at the coupling interface 230.

At block 450, the TRX 110, upon implementation of the crossover correction scheme at blocks 440 and 445, verifies Rx optical signals are detected in the Rx path. For example, determines whether the Rx signals are detected in the Rx path. For example, when the photodiode 240 detects Rx signals at block 450, the fibers are in the arrangement shown in FIG. 3A and the crossover correction scheme in is successfully implemented, enabling the optical connection 125.

In an example where the photodiode 240 does not detect any Rx optical signals at block 450, the fibers may be in the arrangement shown in FIG. 3B. In some examples, the TRX 110 may be able to enable the optical connection 125 for the arrangement shown in FIG. 3B, without manual intervention using the fallback process. In this example, method 400 proceeds to the fallback process at block 435 for further processing. The fallback process is described in more detail in relation to method 500 above. At block 450, upon verification of the successful implementation of the crossover correction scheme, method 400 proceeds to block 455 to generate a crossover notification indicating a crossover condition in the optical connection.

Returning back to block 425, in an example where the interface 230 is not crossover capable, the TRX 110 functions as a crossover detection device or detection only device and method 400 proceeds to block 460. At block 460, the TRX 110 determines whether crossover Rx optical signals are detected at a light sensor in a Tx path in the optical transceiver. For example, the TRX 110 determines whether the light sensor 245 detects signals in the Tx path. In an example where the light sensor 245 does not detect Rx signals at block 460, the TRX 110 is not capable of providing a crossover correction and the method 400 proceeds to block 465. At block 465, the TRX generates a notification for the optical connection indicating the potential Tx/Rx mismatch and proceeds back to block 405. In some examples, multiple processions through the block 465 may signal a mismatch in the connection and that no connection is possible between the TRX 110 and a peer device without manual intervention.

In an example where the light sensor 245 detects Rx signals at block 460, method 400 proceeds to block 470. At block 470, the TRX 110 negotiates or otherwise determines an alternating transmission scheme with the peer optical transceiver and alternates, at the optical transceiver, transmission of Tx optical signals and reception of Rx optical signals according to the alternating transmission scheme at block 475. In some examples, during negotiation or determination of the scheme, the TRX 110 and TRX 120 communicate via a different network connection (e.g., the optical connection 145) in the optical fiber network 100 or other network connection outside of the optical fiber network 100 to determine an alternating transmission scheme in order to use the fiber 117 in a single fiber communication scheme.

In this example, the TRX 110 transmits Tx signals from the Tx path 112 during a Tx time according to the transmission scheme. The TRX 110 also receives Rx signals in the Tx path 112 during a Rx time according to the transmission scheme. In some examples, the light sensor 245 functions as a photodiode and the micro-controller 210 provides the Rx signals to component 214a (e.g., a TIA) as electric signals from the light sensor 245. The single fiber communication scheme allows for a network connection to be enabled over optical connection 125 at a lower throughput than if both fibers were connected properly. While the optical connection 125 is not optimized in this condition, enabling the connection in the non-optimized scheme allows for network connectivity during a time waiting for a technician to manually swap the reversed fibers or repair a broken or disconnected fiber in the optical connection.

From block 475, method 400 proceeds to block 455 where the TRX 110 generates a crossover notification indicating a crossover condition in the optical connection. In some examples, generating the crossover notification includes determining a physical correction type for the crossover correction scheme and providing the physical correction type on a user interface (UI) associated with the optical transceiver. For example, FIGS. 6A-6D illustrate a UI 600 associated with the TRX 110. The UI 600 includes multiple light emitting diode (LED) indicators including LEDs 601-604. The LEDs 601-602 may indicate an operational status of the Tx path 112 and the LEDs 603-604 may indicate an operational status of the Rx path 114. In lighting pattern 610 shown in FIG. 6A, the LEDs 601-604 are all green, indicating that both Tx path 112 and Rx path 114 are operational without any detected reversed swapping error (as detected at TRX 110). For example, when fiber 116 is connected to the Tx path 112 and the fiber 117 is connected to the Rx path 114 (not shown) the LEDs 601-604 will all emit a solid green light. In some examples, the crossover notification may also be provided to a user or other system via an application programming interface, command line interface, etc.

In examples with reversed fibers or crossover conditions, the UI 600 will indicate additional information to aid a technician in manually fixing the problem. For example, when the TRX 110 is crossover enabled and successfully switches signals as described in relation to block 440-450, the UI 600 illuminates according to lighting pattern 620 shown in FIG. 6B. In this example, the LEDs 601 and 603 emit a green light indicating that the network connection via optical connection 125 is fully enabled (via switched signals at the interface 230). The LEDs 602 and 604 emit a yellow light or flashing yellow light to indicate the crossover condition of the fibers 116 and 117 as shown in FIG. 3A. The combination of green and yellow in the lighting pattern 620 indicates that the physical correction type for the crossover correction scheme includes manually swapping the fibers 116 and 117.

In another example, the TRX 110 may utilize the single fiber scheme discussed in block 460-475 and/or the fallback scheme discussed in relation to FIG. 5. In this example, the UI 600 illuminates according to lighting pattern 630 shown in FIG. 6C. In this example, the LEDs 601 and 602 emit a yellow light or flashing yellow light indicating that the network connection via optical connection 125 is partially enabled (via an alternating transition scheme). The LEDs 603 and 604 emit a red light or flashing red light to indicate the crossover condition of the fibers 116 and 117 as shown in FIG. 3B or 3C. The combination of yellow and red in the lighting pattern 630 indicates that the physical correction type for the crossover correction scheme includes manually swapping the fibers 116 and 117 and verifying that signals may transmit down along the fibers once swapped (e.g., verify no breaks or other similar conditions in the fibers).

In another example, the TRX 110 may determine that the fibers are swapped and no connection is possible (e.g., as discussed in block 465). In this example, the UI 600 illuminates according to lighting pattern 640 shown in FIG. 6D. In this example, the LEDs 601-604 emit a red light or flashing red light indicating that the network connection via optical connection 125 is not enabled. The red lights in the lighting pattern 640 also indicates that the physical correction type for the crossover correction scheme includes manually swapping the fibers 116 and 117 and verifying that signals may transmit down along the fibers once swapped (e.g., verify no breaks or other similar conditions in the fibers).

Figure 7:
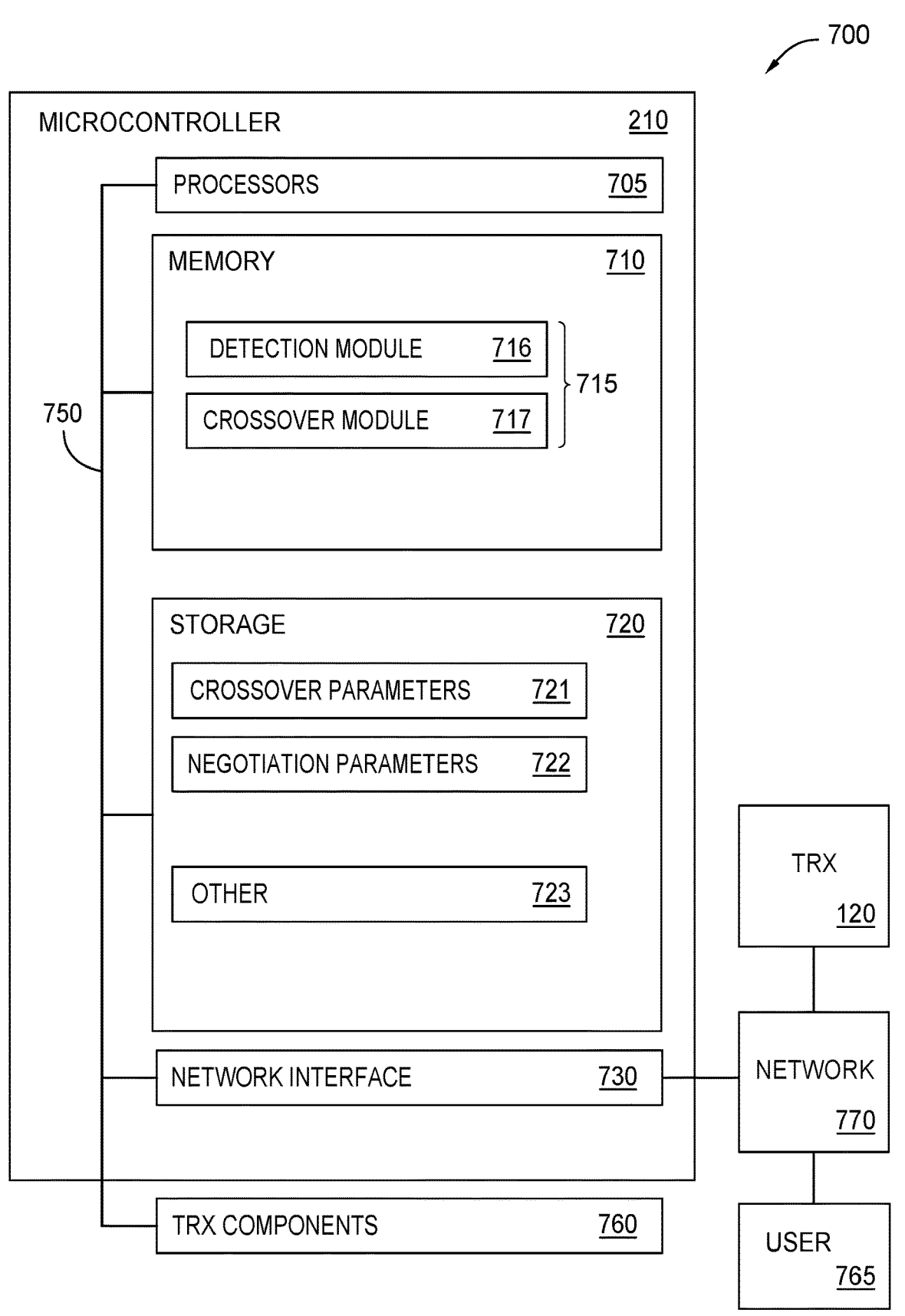
FIG. 7 is a block diagram of a micro-controller of an optical transceiver, according to one embodiment.

FIG. 7 is a block diagram of a micro-controller of an optical transceiver, according to one embodiment. Arrangement 700 may include the TRX 120 with the micro-controller 210 configured to execute the various functions of the controllers described herein. The micro-controller 210 is shown in the form of a general-purpose computing device, but may include a server and/or application executing on a cloud network. The components of micro-controller 210 may include, but are not limited to, one or more processing units or processors 705, a system memory 710, a storage system 720, network interface 730 connecting the micro-controller 210 to network 770 and external networks (including the TRX 120) and a user 765, and a bus 750 that couples various system components including the system memory 710 and storage system 720 to processors 705 along with various other TRX components 760. In other embodiments, arrangement 700 is distributed and includes a plurality of discrete computing devices that are connected through wired or wireless networking.

Bus 750 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Micro-controller 210 typically includes a variety of computer system readable media (e.g., a non-transitory computer-readable storage medium). Such media may be any available media that is accessible by micro-controller 210, and it includes both volatile and non-volatile media, removable and non-removable media.

System memory 710 can include computer system readable media in the form of volatile memory, such as random access memory (RAM) and/or cache memory. Micro-controller 210 may further include other removable/non-removable, volatile/non-volatile computer system storage media. By way of example, storage system 720 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a Compact Disc Read-Only Memory (CD-ROM), digital versatile disc-read only memory (DVD-ROM) or other optical media can be provided. In such instances, each can be connected to bus 750 by one or more data media interfaces. As will be further depicted and described below, system memory 710 may include at least one program product having a set (e.g., at least one) of program modules that are configured to carry out the functions of various embodiments described herein.

Micro-controller 210 may further include other removable/non-removable, volatile/non-volatile computer system storage media. In some examples, storage system 720 may be included as part of system memory 710 and may typically provide a non-volatile memory for the networked computing devices, and may include one or more different storage elements such as Flash memory, a hard disk drive, a solid state drive, an optical storage device, and/or a magnetic storage device. For example, storage system 720 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 750 by one or more data media interfaces. Storage system 720 may include media for a crossover parameters 721, negotiation parameters 722, and other information 723 stored for access and use by the micro-controller 210.

System memory 710 may include a plurality of modules 715 for performing various functions described herein. The modules 715 generally include program code that is executable by one or more of the processors 705. As shown, modules 715 include the detection module 716 and crossover module 717. The modules 715 may also interact with each other and storage system 720 to perform certain functions as described herein.

In the current disclosure, reference is made to various embodiments. However, the scope of the present disclosure is not limited to specific described embodiments. Instead, any combination of the described features and elements, whether related to different embodiments or not, is contemplated to implement and practice contemplated embodiments. Additionally, when elements of the embodiments are described in the form of "at least one of A and B," or "at least one of A or B," it will be understood that embodiments including element A exclusively, including element B exclusively, and including element A and B are each contemplated. Furthermore, although some embodiments disclosed herein may achieve advantages over other possible solutions or over the prior art, whether or not a particular advantage is achieved by a given embodiment is not limiting of the scope of the present disclosure. Thus, the aspects, features, embodiments and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, the embodiments disclosed herein may be embodied as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer readable medium(s) having computer readable program code embodied thereon.

Program code embodied on a computer readable medium may be transmitted using any appropriate medium, including but not limited to wireless, wireline, optical fiber cable, RF, etc., or any suitable combination of the foregoing.

Computer program code for carrying out operations for embodiments of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations and/or block diagrams of methods, apparatuses (systems), and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block(s) of the flowchart illustrations and/or block diagrams.

These computer program instructions may also be stored in a computer readable medium that can direct a computer, other programmable data processing apparatus, or other device to function in a particular manner, such that the instructions stored in the computer readable medium produce an article of manufacture including instructions which implement the function/act specified in the block(s) of the flowchart illustrations and/or block diagrams.

The computer program instructions may also be loaded onto a computer, other programmable data processing apparatus, or other device to cause a series of operational steps to be performed on the computer, other programmable apparatus or other device to produce a computer implemented process such that the instructions which execute on the computer, other programmable data processing apparatus, or other device provide processes for implementing the functions/acts specified in the block(s) of the flowchart illustrations and/or block diagrams.

The flowchart illustrations and block diagrams in the Figures illustrate the architecture, functionality, and operation of possible implementations of systems, methods, and computer program products according to various embodiments. In this regard, each block in the flowchart illustrations or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

In view of the foregoing, the scope of the present disclosure is determined by the claims that follow.

We claim:

1. A method comprising:

determining whether optical signals are detected in a receive (Rx) path in an optical transceiver, the Rx path optically connected to a first port of the optical transceiver;

determining, responsive to not detecting the optical signals in the Rx path, whether the optical signals are detected at a light sensor in a transmit (Tx) path in the optical transceiver, the Tx path optically connected to a second port of the optical transceiver; and responsive to detecting the optical signals at the light sensor in the Tx path:

switching the optical connection of the Rx path to the second port; and switching the optical connection of the Tx path to the first port.

2. The method of claim 1, wherein determining whether optical signals are detected in the Rx path in the optical transceiver comprises:

determining, at a first time, that the optical signals are not detected in the Rx path;

pausing optical transceiver operations until a recheck time; and determining, at the recheck time, whether the optical signals are detected in the Rx path, and wherein the optical transceiver is configured to proceed with the optical transceiver operations responsive to detecting the optical signals in the Rx path.

3. The method of claim 1, wherein the optical transceiver is configured to, responsive to not detecting the optical signals at the light sensor in the Tx path, communicate with a peer optical transceiver to determine capabilities of the peer optical transceiver.

4. The method of claim 1, wherein determining whether the optical signals are detected at the light sensor in the Tx path comprises:

stopping transmission of Tx optical signals in the Tx path; and checking the light sensor for the optical signals.

5. The method of claim 1, wherein the first port and the second port are optically connected to a peer optical transceiver, the method further comprising:

responsive to detecting the optical signals at the light sensor in the Tx path:

determining, after elapse of a backoff time, whether the optical signals are detected in the Rx path, wherein detecting the optical signals in the Rx path indicates that the peer optical transceiver has implemented a peer crossover correction scheme, wherein switching the optical connection of the Rx path and switching the optical connection of the Tx path are responsive to determining that the optical signals are not detected in the Rx path after the elapse of the backoff time.

6. The method of claim 1, wherein the first port and the second port are optically connected to a peer optical transceiver, the method further comprising:

communicating with the peer optical transceiver to determine capabilities of the peer optical transceiver, wherein the peer optical transceiver is capable of crossover switching;

negotiating, responsive to detecting a predetermined condition of a first fiber between the optical transceiver and the peer optical transceiver, with the peer optical transceiver an alternating transmission scheme for communication over a second fiber between the optical transceiver and the peer optical transceiver; and alternating, at the optical transceiver, transmission of Tx optical signals and reception of Rx optical signals over the second fiber, according to the alternating transmission scheme.

7. The method of claim 1, wherein the first port and the second port are optically connected to a peer optical transceiver, the method further comprising:

responsive to determining that the peer optical transceiver is not capable of crossover switching:

alternating, at the optical transceiver, transmission of Tx optical signals and reception of Rx optical signals according to an alternating transmission scheme.

8. The method of claim 1, further comprising:

generating a crossover notification, wherein generating the crossover notification comprises:

determining a physical correction type that indicates the switching the optical connection of the Rx path and the switching the optical connection of the Tx path; and providing the physical correction type on a user interface associated with the optical transceiver.

9. An optical transceiver, comprising:

a processor; and a memory comprising instructions which, when executed on the processor, performs an operation, the operation comprising:

determining whether optical signals are detected in a receive (Rx) path in the optical transceiver, the Rx path optically connected to a first port of the optical transceiver;

determining, responsive to not detecting the optical signals in the Rx path, whether the optical signals are detected at a light sensor in a transmit (Tx) path in the optical transceiver, the Tx path optically connected to a second port of the optical transceiver; and responsive to detecting the optical signals at the light sensor in the Tx path:

switching the optical connection of the Rx path to the second port; and switching the optical connection of the Tx path to the first port.

10. The optical transceiver of claim 9, wherein determining whether optical signals are detected in the Rx path in the optical transceiver comprises:

determining, at a first time, that the optical signals are not detected in the Rx path;

pausing optical transceiver operations until a recheck time; and determining, at the recheck time, whether the optical signals are detected in the Rx path, and

wherein the optical transceiver is configured to proceed with the optical transceiver operations responsive to detecting the optical signals in the Rx path.

11. The optical transceiver of claim 9, wherein the first port and the second port are optically connected to a peer optical transceiver, the operation further comprising:

communicating with the peer optical transceiver to determine capabilities of the peer optical transceiver, wherein the peer optical transceiver is capable of crossover switching;

negotiating, responsive to detecting a predetermined condition of a first fiber between the optical transceiver and the peer optical transceiver, with the peer optical transceiver an alternating transmission scheme for communication over a second fiber between the optical transceiver and the peer optical transceiver; and alternating, at the optical transceiver, transmission of Tx optical signals and reception of Rx optical signals over the second fiber, according to the alternating transmission scheme.

12. The optical transceiver of claim 9, the operation further comprising:

responsive to not detecting the optical signals at the light sensor in the Tx path, communicating with a peer optical transceiver to determine capabilities of the peer optical transceiver.

13. The optical transceiver of claim 9, wherein the first port and the second port are optically connected to a peer optical transceiver, the operation further comprising:

responsive to determining that the peer optical transceiver is not capable of crossover switching:

alternating, at the optical transceiver, transmission of Tx optical signals and reception of Rx optical signals according to an alternating transmission scheme.

14. The optical transceiver of claim 9, the operation further comprising:

generating a crossover notification, wherein generating the crossover notification comprises:

determining a physical correction type that indicates the switching the optical connection of the Rx path and the switching the optical connection of the Tx path; and providing the physical correction type on a user interface associated with the optical transceiver.

15. An optical transceiver comprising:

a first port and a second port;

a receive (Rx) path optically connected to the first port;

a transmit (Tx) path optically connected to the second port;

a light sensor in the Tx path; and control logic configured to perform an operation, the operation comprising:

determining whether optical signals are detected in the Rx path;

determining, responsive to not detecting the optical signals in the Rx path, whether the optical signals are detected at the light sensor in the Tx path; and responsive to detecting the optical signals at the light sensor in the Tx path:

switching the optical connection of the Rx path to the second port; and switching the optical connection of the Tx path to the first port.

16. The optical transceiver of claim 15, wherein determining whether optical signals are detected in the Rx path in the optical transceiver comprises:

determining, at a first time, that the optical signals are not detected in the Rx path;

pausing optical transceiver operations until a recheck time; and determining, at the recheck time, whether the optical signals are detected in the Rx path, and wherein the optical transceiver is configured to proceed with the optical transceiver operations responsive to detecting the optical signals in the Rx path.

17. The optical transceiver of claim 15, wherein the first port and the second port are optically connected to a peer optical transceiver, the operation further comprising:

responsive to detecting the optical signals at the light sensor in the Tx path:

determining, after elapse of a backoff time, whether the optical signals are detected in the Rx path, wherein detecting the optical signals in the Rx path indicates that the peer optical transceiver has implemented a peer crossover correction scheme, wherein switching the optical connection of the Rx path and switching the optical connection of the Tx path are responsive to determining that the optical signals are not detected in the Rx path after the elapse of the backoff time.

18. The optical transceiver of claim 15, the operation further comprising:

responsive to not detecting the optical signals are at the light sensor in the Tx path, communicating with a peer optical transceiver to determine capabilities of the peer optical transceiver.

19. The optical transceiver of claim 15, wherein the first port and the second port are optically connected to a peer optical transceiver, the operation further comprising:

communicating with the peer optical transceiver to determine capabilities of the peer optical transceiver, wherein the peer optical transceiver is capable of crossover switching;

negotiating, responsive to detecting a predetermined condition of a first fiber between the optical transceiver and the peer optical transceiver, with the peer optical transceiver an alternating transmission scheme for communication over a second fiber between the optical transceiver and the peer optical transceiver; and alternating, at the optical transceiver, transmission of Tx optical signals and reception of Rx optical signals over the second fiber, according to the alternating transmission scheme.

20. The optical transceiver of claim 15, wherein the first port and the second port are optically connected to a peer optical transceiver, the operation further comprising:

responsive to determining that the peer optical transceiver is not capable of crossover switching:

alternating, at the optical transceiver, transmission of Tx optical signals and reception of Rx optical signals according to an alternating transmission scheme.

* * * * *